United States Patent Office 2,712,980
Patented July 12, 1955

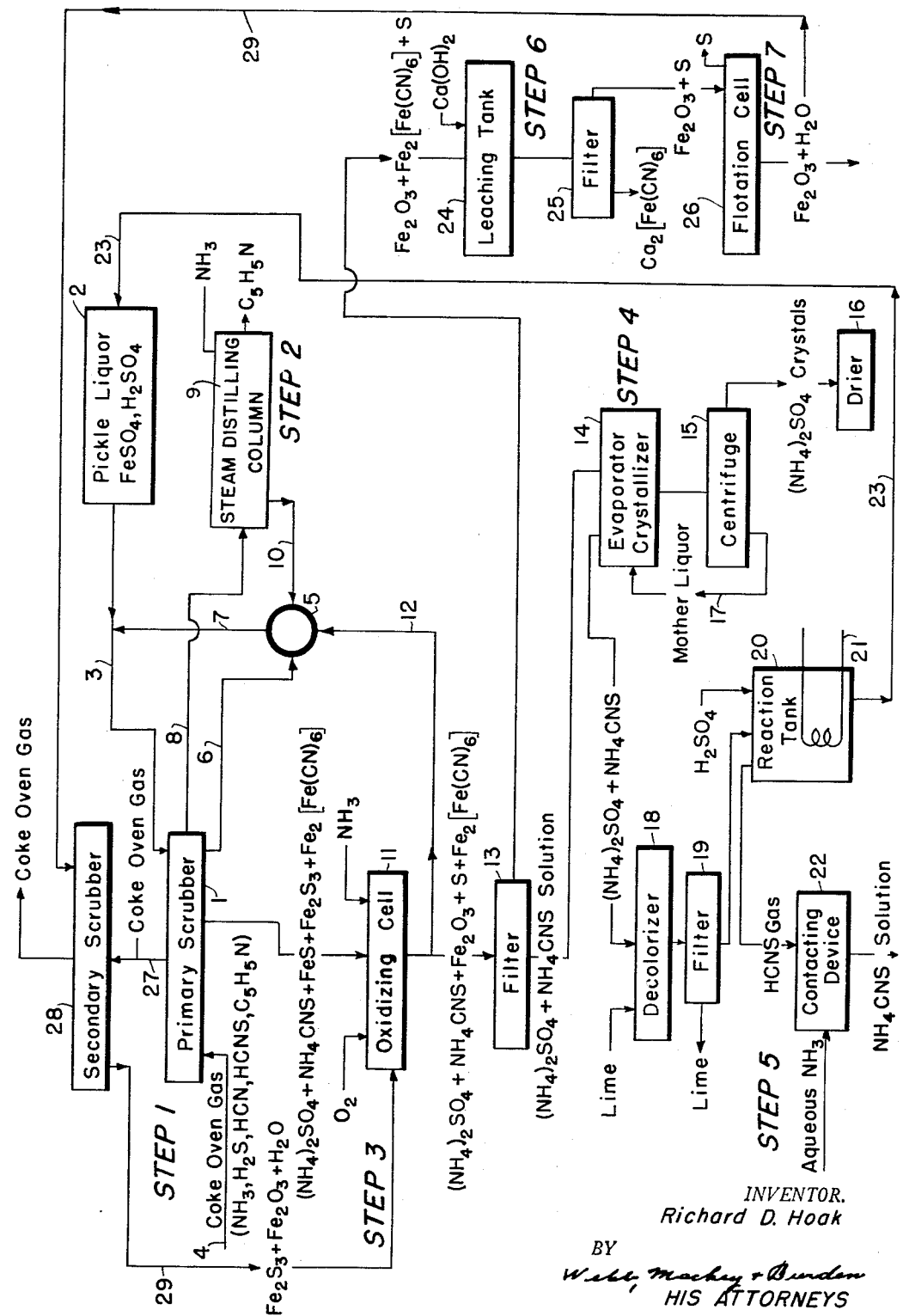

2,712,980

PROCESS FOR USING SULPHATE LIQUORS FOR RECOVERING VALUES FROM COKE OVEN GAS

Richard D. Hoak, Whitehall, Pa.

Application September 6, 1952, Serial No. 308,271

13 Claims. (Cl. 23—76)

This invention relates to a process for using liquors containing ferrous sulphate and sulphuric acid for recovering values from coke oven gas. Spent pickle liquor resulting from the cleaning of steel with sulphuric acid is one such liquor. A similar liquor is produced in the manufacture of titania.

Stream pollution from discharge of spent pickle liquor can be avoided by treatment with lime to neutralize the free acid and precipitate the iron. Hydrated iron oxide and calcium sulphate are precipitated, but the resultant sludge is of no value and must be impounded. This is an expensive operation. The process to be described recovers a number of valuable by-products and produces substantially no waste.

Coke oven gas contains, among other things, ammonia, $NH_3$, hydrogen sulphide, $H_2S$, hydrogen cyanide, $HCN$, thiocyanic acid, $HCNS$, pyridine, $C_5H_5N$, and certain of their salts.

In the present process, coke oven gas is reacted with spent pickle liquor or other similar liquor, and thereafter certain steps are employed which result in production of (a) ammonium sulphate, useful as a fertilizer to supply nitrogen to the soil, (b) iron oxide, which can be agglomerated by sintering and recharged to blast furnaces, (c) elemental sulphur, adaptable to agricultural uses or for sulphuric acid manufacture, (d) ferrocyanide, valuable for pigment manufacture and other uses, (e) pyridine, important as a raw material in the organic chemical industry, and (f) ammonium thiocyanate, valuable as a component of weed killing compositions. Although coke oven gas normally contains only a trace of thiocyanic acid, an additional small amount of this compound is formed in the scrubbing operation described below.

The accompanying drawing is a flow sheet which illustrates a preferred embodiment of my invention.

The process may be carried out as follows:

Step 1

Raw coke oven gas, after removal of suspended tar particles in a detarrer, is scrubbed with pickle liquor in a suitable contacting device such as the primary scrubber 1. Pickle liquor is fed from a tank 2 to the scrubber through line 3 and coke oven gas is fed to the scrubber through line 4. The slurry is recirculated through the scrubber by pump 5 through lines 6, 7 and 3. In the scrubber 1, reactions occur according to the following general equations:

(1)          $2NH_3 + H_2SO_4 = (NH_4)_2SO_4$
(2)    $2NH_3 + FeSO_4 + H_2S = (NH_4)SO_4 + FeS$
(3)          $6NH_3 + 3FeSO_4 + 6HCN =$
                     $3(NH_4)_2SO_4 + Fe_2(Fe(CN)_6)$
(4)          $NH_3 + HCNS = NH_4CNS$

The extent to which these reactions occur will depend on the relative quantities of the four gaseous components $NH_3$, $H_2S$, $HCN$ and $HCNS$ and their availability for reaction. Availability for reaction is a function of solubility, because the reactions occur in the liquid phase. Since ammonia and hydrogen cyanide are very much more soluble in water than hydrogen sulphide, they react promptly and substantially completely according to Equations 1 and 3. It follows from this that the amount of hydrogen sulphide that can react is limited to the equivalent weight of ammonia minus the equivalent weight of hydrogen cyanide in the gas. Where coke oven gas contains more hydrogen sulphide than ammonia, on an equivalent basis, hydrogen sulphide cannot be completely removed by pickle liquor alone in this step.

Hydrogen sulphide reacts readily with active ferric oxide, according to the equation:

(5)    $Fe_2O_3 \cdot XH_2O + 3H_2S = Fe_2S_3 + 3H_2O + XH_2O$

Substantially complete removal of hydrogen sulphide can be effected, therefore, by recirculation to the gas scrubber of a portion of the freshly formed hydrated ferric oxide produced in Step 3 of the process, hereafter described.

In effecting the above reactions in gas scrubber 1, the temperature of the liquor recirculated through the scrubber should be approximately the same as the temperature of the raw gas, which usually is within a range of about 45 to 55° C. Operating at superatmospheric temperature increases reaction rates and prevents excessive condensation of moisture from the gas. The pH of the recirculated liquor should be held within the range of about 6.2 to 7.0 for optimum removal of ammonia and pyridine from the gas, but the process will operate successfully somewhat outside this range. If the scrubber is operated at pH of 6, efficiency of ammonia absorption will be low. On the other hand, as the pH is raised above 7, the danger of solubilizing ferrocyanide becomes increasingly greater. The control of pH can be accomplished by controlling the rate of pickle liquor feed.

Tar bases such as pyridine and its homologues are removed from the gas in this step by adsorption and/or chemical reaction. These tar bases are recovered as described in Step 2 below.

Step 2

A stream of slurry is withdrawn from a point in the primary scrubber 1, where its pH is in the range 6.2–6.3, and passed through line 8 to a distilling column 9 where its pH is adjusted to 7.2–7.5 with ammonia vapor to liberate the tar bases, which are stripped from the slurry by steam distillation. These tar bases are valuable intermediates in the organic chemical industry. The slurry from the distilling column is returned through line 10 to the slurry recirculation system of the primary scrubber.

Step 3

The slurry from scrubber 1 is oxidized in an oxidizing cell 11 like that of the Hoak Patent 2,529,874, wherein the slurry is aerated with stirring. This oxidation is carried out at such intensity that it oxidizes ferrous and ferric sulphides to ferric oxide and free sulphur, both of which are insoluble, according to the reactions:

(6)        $2FeS + 1\frac{1}{2}O_2 = Fe_2O_3 + 2S$
(7)        $Fe_2S_3 + 1\frac{1}{2}O_2 = Fe_2O_3 + 3S$ It is desirable to operate the oxidation step at a temperature of about 45 to 50° C. This maintains a satisfactorily high reaction rate.

Maintenance of the slurry in an optimum pH range is an important factor in the oxidation step. During oxidation, there is a strong tendency for the pH to fall sharply. Provision must therefore be made to feed ammonia, preferably as vapor from the ammonia still, to hold the pH in the optimum range. The preferred pH range is 6.5 to 7.5. In this step, it is necessary to keep the pH high enough to provide a rapid oxidation rate and low enough to avoid solubilizing ferrocyanide. Below 6.5, the oxidation rate decreases rapidly; above 7.5, the danger of solubilizing ferrocyanide becomes great.

By operating within the preferred pH range, the supernatant is only slightly discolored.

The oxidation can be accomplished either with air or oxygen. The latter is preferred because of the much higher reaction rate attained with it. When oxygen is used, oxidation is complete in about 15 minutes.

Step 4

Part of the slurry from the oxidizing cell 11 is recycled through line 12, pump 5 and lines 7 and 3 to the primary scrubber 1 of Step 1 to increase the efficiency of removal of hydrogen sulphide from the coke oven gas. The remainder of the slurry from the oxidizing cell 11 is passed to a filter 13 and the filtrate from filter 13 which is essentially a solution of ammonium sulphate contaminated with ammonium thiocyanate is sent to an evaporator-crystallizer 14 for recovery of ammonium sulphate. The slurry of ammonium sulphate crystals and most of the mother liquor discharges from the crystallizer to a centrifuge 15. The ammonium sulphate crystals from the centrifuge are washed with water and then discharged to a drier 16 and packaged. The mother liquor from the centrifuge is returned to crystallizer 14 through line 17.

Step 5

In any continuous crystallization process, such impurities as may be present tend to accumulate in the mother liquor. It is necessary to remove such impurities either periodically or continuously to insure a high quality crystalline product. The principal impurity in the present case is ammonium thiocyanate, and it is essential that this compound be removed because of its toxicity to plants if the ammonium sulphate is to be used in fertilizer compositions. If the oxidation Step 3 in oxidizing cell 11 is not operated within the preferred optimum range of pH, the liquor from filter 13 which is fed to crystallizer 14 may be somewhat discolored from time to time, and such discoloring material would tend to accumulate in the crystallizer and discolor the ammonium sulphate crystals separated in centrifuge 15. Discoloring material and ammonium thiocyanate are removed from the ammonium sulphate mother liquor as follows.

A small proportion of the mother liquor is withdrawn continuously from the crystallizer 14 and passed to a decolorizer mixing chamber 18, where it is treated with a decolorizer such as lime. The lime and the discolorizing impurities are filtered from the solution on a filter 19, and the filtrate is passed to a closed reaction tank 20 equipped with a heater 21, and the solution is heated. A substantial excess of sulphuric acid is added in the reaction tank to convert the ammonium thiocyanate to thiocyanic acid which is volatilized by the heat, and passes off from the reaction tank. The reaction is represented by the following equation:

(8) $2NH_4CNS + H_2SO_4 = (NH_4)_2SO_4 + 2HCNS$

The thiocyanic acid gas is passed to a contacting device 22 where it is reacted with aqueous ammonia (or other desired alkaline compound) to form ammonium thiocyanate solution. Crystalline ammonium thiocyanate can be recovered if desired, but the concentrated solution finds a market for preparation of certain weed killing compositions. The ammonium sulphate originally present in the mother liquor fed to decolorizer 18 and the ammonium sulphate solution formed in reaction tank 20 in accordance with Equation 8, together with the excess sulphuric acid from tank 20, are returned through line 23 to pickle liquor tank 2 and from there to primary scrubber 1.

Step 6

The sludge from filter 13 is leached with a caustic solution in leaching tank 24 to recover its ferrocyanide content. Any suitable caustic can be used but high calcium lime would usually be preferred because of the low cost of the reagent and the fact that calcium ferrocyanide, $Ca(Fe(CN)_6)$, is very soluble, yielding a highly concentrated solution. The slurry from leaching tank 24 is filtered on filter 25. The filtrate, calcium ferrocyanide, is a valuable by-product that is in demand by pigment manufacturers.

Step 7

The residue separated on filter 25, and consisting essentially of ferric oxide and free sulphur, is fed to a flotation cell 26 where, with addition of a suitable frother such as eucalyptol, the elemental sulphur formed in the oxidizing Step 3 is removed by skimming. Sulphur of 95% purity has been recovered in this step. The principal impurity is ferric oxide, and the product can be upgraded by treatment with hydrochloric acid to dissolve the contaminant. The raw product, however, is entirely suitable for agricultural uses or for manufacture of sulphuric acid. The sulphur can also be recovered from the sludge by extraction with carbon disulphide, or by drying and heating the sludge to separate the sulphur by distillation, but flotation will generally be preferred.

The residue from flotation cell 26, which consists essentially of ferric oxide, is sent to a sintering machine for agglomeration to a semifused oxide for blast furnace charging. This residue can be advantageously combined with blast furnace dust and sintered therewith.

As previously pointed out, a portion of the slurry from the oxidizing cell 11 is returned to the primary scrubber 1 through line 12 and pump 5 in order to remove from the coke oven gas excess hydrogen sulphide which is not removed by the pickle liquor alone. An alternative method of removing the excess hydrogen sulphide from the coke oven gas is to pass the gas issuing from primary scrubber 1 through line 27 and secondary scrubber 28, form an aqueous suspension of a portion of the ferric oxide from flotation cell 26 and return it through line 29 to the secondary scrubber 28 for scrubbing the coke oven gas issuing from the primary scrubber 1. The slurry from scrubber 28 is sent through line 29 to the oxidizing cell 11. If desired, both of these methods can be employed, that is, slurry from oxidizing cell 11 and slurry from flotation cell 26 can be returned to the system for further scrubbing of coke oven gas.

The invention is not limited to the preferred embodiment, but may be otherwise embodied or practiced within the scope of the following claims.

I claim:

1. A process which comprises reacting an aqueous solution containing ferrous sulphate and sulphuric acid with coke oven gas containing ammonia, hydrogen sulphide, hydrogen cyanide, thiocyanic acid and tar bases, to produce liquor containing ammonium sulphate, iron sulphide, iron ferrocyanide, ammonium thiocyanate and tar bases, oxidizing the liquor at a pH of 6.5 to 7.5 at such intensity as to convert iron sulphide into iron oxide and free sulphur, separating the solution containing ammonium sulphate and ammonium thiocyanate from the solids containing iron oxide, iron ferrocyanide and free sulphur, crystallizing ammonium sulphate from the solution, treating mother liquor resulting from the ammonium sulphate crystallization to recover ammonium thiocyanate, leaching the solids containing iron oxide, iron ferrocyanide and free sulphur with caustic solution to remove iron ferrocyanide, and separating free sulphur from the iron oxide.

2. A process according to claim 1, wherein the liquor containing ammonium sulphate, iron sulphide, iron ferrocyanide, ammonium thiocyanate and tar bases is treated with steam to distill off the tar bases.

3. A process according to claim 1, wherein the liquor containing ammonium sulphate, iron sulphide, iron ferrocyanide, ammonium thiocyanate and tar bases and having a pH of 7.2 to 7.5 is treated with steam to distill off the tar bases.

4. A process according to claim 1, wherein the mother liquor resulting from the ammonium sulphate crystallization is treated with sulphuric acid in the proportions of about 1 mol ammonium thiocyanate to 1 mol acid to convert the ammonium thiocyanate to ammonium sulphate and thiocyanic acid, and heating to liberate thiocyanic acid gas.

5. A process according to claim 4, wherein the thiocyanic acid gas is reacted with ammonia to produce ammonium thiocyanate.

6. A process according to claim 1, wherein during the oxidizing step to convert iron sulphide into iron oxide and free sulphur, the liquor being oxidized is maintained at a temperature of 45 to 50° C.

7. A process according to claim 1, wherein a portion of the iron oxide formed in the process is recirculated and reacted with hydrogen sulphide contained in the coke oven gas.

8. A process according to claim 1, wherein a portion of the liquor containing iron oxide is recirculated to the aqueous solution containing ferrous sulphate and sulphuric acid for removing a further quantity of hydrogen sulphide from the coke oven gas.

9. A process according to claim 1, wherein the coke oven gas after reacting with the aqueous solution containing ferrous sulphate and sulphuric acid is further reacted with an aqueous slurry containing iron oxide formed in the process for removing a further quantity of hydrogen sulphide from the gas.

10. A process which comprises recirculating an aqueous solution containing ferrous sulphate and sulphuric acid in contact with coke oven gas containing ammonia, hydrogen sulphide, hydrogen cyanide, thiocyanic acid and tar bases while maintaining the recirculated liquor at a pH of 6.2 to 7.0, to produce liquor containing ammonium sulphate, iron sulphide, iron ferrocyanide, ammonium thiocyanate and tar bases, treating the liquor with steam while the liquor is at a pH of 7.2 to 7.5 to distill off the tar bases, oxidizing the liquor at a pH of 6.5 to 7.5 to convert iron sulphide into iron oxide and free sulphur, separating the solution containing ammonium sulphate and ammonium thiocyanate from the solids containing iron oxide, iron ferrocyanide and free sulphur, crystallizing ammonium sulphate from the solution, treating mother liquor resulting from the ammonium sulphate crystallization with sulphuric acid and heating to convert ammonium thiocyanate to ammonium sulphate and thiocyanic acid gas, contacting the thiocyanic acid gas with aqueous ammonia to form ammonium thiocyanate solution, leaching the solids containing iron oxide, iron ferrocyanide and free sulphur with caustic solution to remove iron ferrocyanide, subjecting the residue to froth flotation and floating off the free sulphur, and recovering the iron oxide.

11. A process according to claim 10, wherein the aqueous solution containing ferrous sulphate and sulphuric acid which is recirculated in contact with the coke oven gas is maintained at a temperature of about 45 to 55° C., and wherein the liquor is oxidized at a temperature of about 45 to 50° C.

12. A process which comprises countercurrently contacting in a contacting device an aqueous contacting liquor containing ferrous sulfate and sulfuric acid with coke oven gas containing ammonia, hydrogen sulfide, hydrogen cyanide, thiocyanic acid and tar bases, recirculating the contacting liquor while maintaining its pH at a value between 6.2 and 7.0 by supplying fresh contacting liquor, withdrawing a side stream of contacting liquor from the contacting device at a point where its pH is in the range of 6.2 to 6.3, raising the pH of this stream to 7.2 to 7.5 with ammonia to liberate pyridine, steam-distilling the pyridine and returning the pyridine-free stream to the contacting device, withdrawing from the contacting device a volume of liquor containing ammonium sulfate, iron sulfide, iron ferrocyanide, and ammonium thiocyanate, oxidizing the liquor with oxygen-containing gas at a temperature of 45° to 50° C. and at a pH of 6.5 to 7.5 to convert iron sulfide into iron oxide and free sulfur while holding the iron ferrocyanide in the solid phase, separating the solution containing ammonium sulfate and ammonium thiocyanate from the solids containing iron oxide, iron ferrocyanide and free sulfur, and crystallizing ammonium sulfate from the solution.

13. In a process wherein an aqueous solution containing ferrous sulfate and sulfuric acid is contacted with coke oven gas containing ammonia, hydrogen sulfide, hydrogen cyanide, thiocyanic acid and tar bases, to produce liquor containing ammonium sulfate, iron sulfide, iron ferrocyanide, ammonium thiocyanate, and tar bases, and the liquor is thereafter contacted with oxygen-containing gas, the improvement which comprises contacting the liquor at a temperature of 45° to 50° C. and at a pH of 6.5 to 7.5 with oxygen-containing gas with an intensity sufficient to convert iron sulfide into iron oxide and free sulfur.

References Cited in the file of this patent

UNITED STATES PATENTS

| Number | Name | Date |
|---|---|---|
| 961,763 | Falding | June 21, 1910 |
| 1,984,757 | Overdick | Dec. 18, 1934 |
| 2,218,117 | Marek | Oct. 15, 1940 |
| 2,366,915 | Lento, Jr., et al. | Jan. 9, 1945 |
| 2,416,744 | Francis | Mar. 4, 1947 |
| 2,427,555 | Elzi | Sept. 16, 1947 |
| 2,443,765 | Francis | June 22, 1948 |
| 2,448,425 | Francis | Aug. 31, 1948 |
| 2,511,306 | Tiddy | June 13, 1950 |
| 2,511,307 | Tiddy | June 13, 1950 |

OTHER REFERENCES

Williams "Cyanogen Compounds," pages 182, 201 (1948), Edward Arnold and Co., London.